United States Patent
Hamahashi et al.

(10) Patent No.: US 7,327,867 B2
(45) Date of Patent: Feb. 5, 2008

(54) METHODS FOR RECOGNIZING NUCLEUS AREA AND CONSTRUCTING CELL LINEAGE

(75) Inventors: Shugo Hamahashi, Tokyo (JP); Shuichi Onami, Tokyo (JP); Hiroaki Kitano, Saitama (JP)

(73) Assignee: Japan Science and Technology Corporation, Kawaguchi-shi (JP)

( * ) Notice: Subject to any disclaimer, the term of this patent is extended or adjusted under 35 U.S.C. 154(b) by 849 days.

(21) Appl. No.: 10/203,058

(22) PCT Filed: Nov. 13, 2001

(86) PCT No.: PCT/JP01/09902

§ 371 (c)(1),
(2), (4) Date: Oct. 4, 2002

(87) PCT Pub. No.: WO02/45018

PCT Pub. Date: Jun. 6, 2002

(65) Prior Publication Data

US 2003/0108231 A1 Jun. 12, 2003

(30) Foreign Application Priority Data

Dec. 1, 2000 (JP) ............................. 2000-367281

(51) Int. Cl.
*G06K 9/00* (2006.01)
*G06K 9/34* (2006.01)
*G06K 9/46* (2006.01)
*G06K 9/62* (2006.01)
*C12N 15/08* (2006.01)
*G01N 33/554* (2006.01)

(52) U.S. Cl. ...................... 382/133; 382/173; 382/180; 382/190; 382/224; 435/454; 436/519

(58) Field of Classification Search ................ 382/128, 382/133, 134, 173, 180, 190, 224–228; 435/70.1, 435/451–455; 436/519
See application file for complete search history.

(56) References Cited

U.S. PATENT DOCUMENTS 5,783,408 A * 7/1998 Hamilton et al. ............. 435/29

(Continued)

FOREIGN PATENT DOCUMENTS

| JP | 60-164236 | 8/1985 |
| JP | 10-185911 | 7/1998 |

OTHER PUBLICATIONS

Ralf Schnabel, Harald Hutter, Don Moerman, and Heinke Schnabel, Assessing Normal Embryogenesis in *Caenorhabditis elegans* Using a 4D microscope: Variablity of Development and Regional Specification, Developmental Biology 184, 234-265 (1997), p. 234-265.*

(Continued)

*Primary Examiner*—Bhavesh M. Mehta
*Assistant Examiner*—Manav Seth
(74) *Attorney, Agent, or Firm*—Christensen O'Connor Johnson Kindness PLLC

(57) ABSTRACT

A cell lineage can be constructed in a less labor intensive manner and in less time by using a computer. Areas, which are misidentified as nuclei, are efficiently removed. The invention comprises the steps of: selecting one or more nuclei for making a forward link from extracted nucleus candidates, in a plurality of 4D microscopic images in which the nucleus candidates are extracted; obtaining forward linkage information by sequentially extracting a nucleus candidate that meets a predetermined link condition with regard to the selected one or more nuclei from said 4D images; selecting one or more nuclei for making a reverse link from the forward linkage information; and obtaining backward linkage information by sequentially extracting a nucleus candidate that meets a predetermined link condition with regard to the selected one or more nuclei for backward link from said 4D images, removing misidentified nucleus candidates from the forward link information based on the reverse link information. The cell lineage is constructed simultaneously at the time of obtaining the forward link information and reverse link information.

16 Claims, 12 Drawing Sheets

U.S. PATENT DOCUMENTS 6,337,472 B1 *   1/2002   Garner et al. ............ 250/201.3
6,834,238 B1 * 12/2004   Hochman .................... 702/21
6,902,883 B2 *   6/2005   Dunlay et al. ................. 435/4

OTHER PUBLICATIONS

Tomohiro Yasuda, Hideo Bannai, Shuichi Onami, Satoru Miyano, Hiroaki Kitano; "Towards Automatic Construction of Cell-Lineage of *C. elegans* from Nomarski DIC Microscope Images", Genome Informatics 1999, Dec. 14-15, 1999.*

Assessing Normal Embryogenesis in *Caenorhabditis elegans* Using a 4D Microscope: Variability of Development and Regional Specification. By R. Schnabel, H. Hutter, D. Moerman and H. Schnabel. *From Developmental Biology 184*, pp. 234-265 (1997), Article No. DB978509.

* cited by examiner

VIEW FROM THE TOP

Overlapping

VIEW FROM THE TOP

A-B distance equal or less than a specified distance $$(ValueA) = \frac{Sc}{Sa} \qquad (ValueB) = \frac{Sc}{Sb}$$

○ Nucleus Area
□ Area Not Inherently Nucleus
→ Right Lineage
┄▶ Wrong Lineage

Designating as initial information

→ T

Removing non-nucleus areas from lineage

Designating as initial information

METHODS FOR RECOGNIZING NUCLEUS AREA AND CONSTRUCTING CELL LINEAGE

FIELD OF THE INVENTION

The present invention relates to a method for constructing cell lineage, and more particularly relates to a method for preparing cell lineage from a 4D-microscopic image of a subject of observation. Moreover, the present invention relates especially to a method of constructing cell lineage from 4D-microscopic images of an embryological stage of the nematode *Caenorhabditis elegans* (hereinafter referred to as *C. elegans*), with the images being taken using a Nomarski DIC microscope (hereafter referred to as a "Nomarski microscope").

BACKGROUND OF THE INVENTION

The nematode *C. elegans*, discovered by Sidney Brenner in 1965, is the experimental organism (coliform bacillus, yeast, nematode, fly, South African clawed frog, zebrafish, mouse, etc.) that has been analyzed in the most detail in modem molecular biology. *C. elegans* is the simplest organism among experimental multicellular organisms. It also requires only approximately 3 days until a fertilized egg becomes an adult.

With multicellular organisms, an adult made up from many cells is basically produced by repeated sequential cell division of a single fertilized egg (a single cell). A dendrogram of a division sequence starting from a fertilized egg is referred to as "cell lineage". *C. elegans* is the only multicellular organism for which cell lineage from a fertilized egg to adulthood has been clarified. This cell lineage was determined by Sulston et al. in 1983.

All normal (wild-type) *C. elegans* individuals exhibit identical cell lineage from egg fertilization to adulthood. In the case of mutation of specific genes, a change in the function of mutated genes causes a change in the pattern of cell division, i.e., cell lineage, from that of the wild type. A huge number of genes have been identified rapidly by an advance of research based on a presumption of the function of the mutated gene from the change of the cell lineage. The mass production of mutant animals has now begun. In consideration of the effective application of resources, automated analysis of cell lineage that is a starting point in the analysis of gene function is an essential technique.

For preparation of a conventional cell lineage, the so-called Nomarski microscope is used. In the Nomarski microscope, two beams of light (of identical wave form and phase, but having a very small difference in the light path) are generated by a set consisting of a polarizing plate and a Nomarski prism. The subject of observation is irradiated with these beams passing through the subject of observation. Differences in the refractive index of and optical path length through the sample produce different phases in the two beams of light after transmission. The two beams of transmitted light converge on the same optical path by the action of the set of polarizing plate and Nomarski prisms, but the phase difference between the two light beams causes interference. When using the Nomarski microscope, enhanced contrast produced by the action of interference facilitates observation. According to this method, the external shape and distribution of contents of a transparent subject is observed as contrasting light and dark areas. Biologically, a cell content and external shape (cell membrane), both transparent when using a common optical microscope, can be observed as areas of light and dark.

Sulston et al determined the cell lineage of *C. elegans* by preparing a sketch from images observed under a Nomarski microscope with the unaided eye. This consumed a considerable amount of time (probably 1 year or more) and labor.

More recently, cell lineage is generally prepared using a 4D microscopic image produced by employing the Nomarski microscope. A microscopic image yielded from observations made at specific focal points is regarded as a 2D (x–y axis) sectional image obtained by the action of cutting the subject of observation horizontally in a specific position. That is, moving the focal point up and down (moving along the z axis) yields a sectional image produced by cutting the subject of observation in various slices along the z axis. Unifying these images allows the reconstruction of the 3D shape of the subject of observation (3D image). Moreover, collection of a time series of 3D images allows temporal changes in the subject of observation to be followed. An image taken in this manner is referred to as a "4D (4-dimensional) microscopic image".

Undoubtedly, present day methods for the construction of a 4D microscopic image are straightforward in comparison with those used at the time of Sulston's study. Nonetheless, considerable time and labor are still consumed, since decisions regarding the boundaries of the cell nucleus and cell membrane in the 4D image require input by the user. For example, a preparation from fertilized egg to 16-cells requires one day or more.

It is important to precisely recognize a nucleus area from the obtained image in order to construct the cell lineage. The recognition by image processing algorithms is incomplete, since in accordance with an increase in the number of cells, some areas (false positives) are recognized erroneously as the nuclear area. It is difficult to build up the cell lineage correctly from data containing many false positives. The operation for manually removing the misidentified nucleus areas from the result of the automatic recognition by human judgment is required.

The present invention sets out to make conventional preparation of the cell lineage more straightforward and has an object of providing a method for constructing cell lineage that is less labor intensive and requires less time as a result of using a computer.

Another object of the present invention is to efficiently remove misidentified nucleus areas (false positives).

DISCLOSURE OF THE INVENTION

A method for detecting a nucleus area of the present invention comprises the steps of: selecting one or more nuclei from a plurality of nucleus candidates as initial information, in a plurality of 4D microscopic images of a cell in which the nucleus candidates are extracted; obtaining linkage information by sequentially extracting a nucleus candidate that meets a predetermined link condition with regard to the initial information from the 4D images; and removing information of a non-nucleus area(s) from the obtained linkage information.

The step for removing non-nucleus area information from the obtained linkage information comprises the steps of: selecting one or more nuclei from a plurality of nucleus candidates other than the first initial information as second initial information, said candidates being extracted from a plurality of 4D microscopic images; obtaining reverse linkage information by sequentially extracting a nucleus candidate that meets a predetermined link condition with regard to the second initial information from the 4D images, the reverse link executing in a direction opposite to a direction of the link based on the first initial information; and removing a nucleus candidate that is not included in the reverse linkage information from the obtained linkage information on the first initial information.

A method for constructing cell lineage of the present invention comprises the steps of: selecting one or more nuclei for making a forward link from extracted nucleus candidates, in a plurality of 4D microscopic images in which the nucleus candidates are extracted; obtaining forward linkage information by sequentially extracting a nucleus candidate that meets a predetermined link condition with regard to said selected one or more nuclei from said 4D images; selecting one or more nuclei for making a reverse link from said forward linkage information; and obtaining backward linkage information by sequentially extracting a nucleus candidate that meets a predetermined link condition with regard to said selected one or more nuclei for backward link from said 4D images, removing misidentified nucleus candidates from said forward link information based on said reverse link information and wherein a position where a branch of link information is increased is regarded as a cell division.

THE BEST MODE FOR CARRYING OUT THE INVENTION

Figure 1:
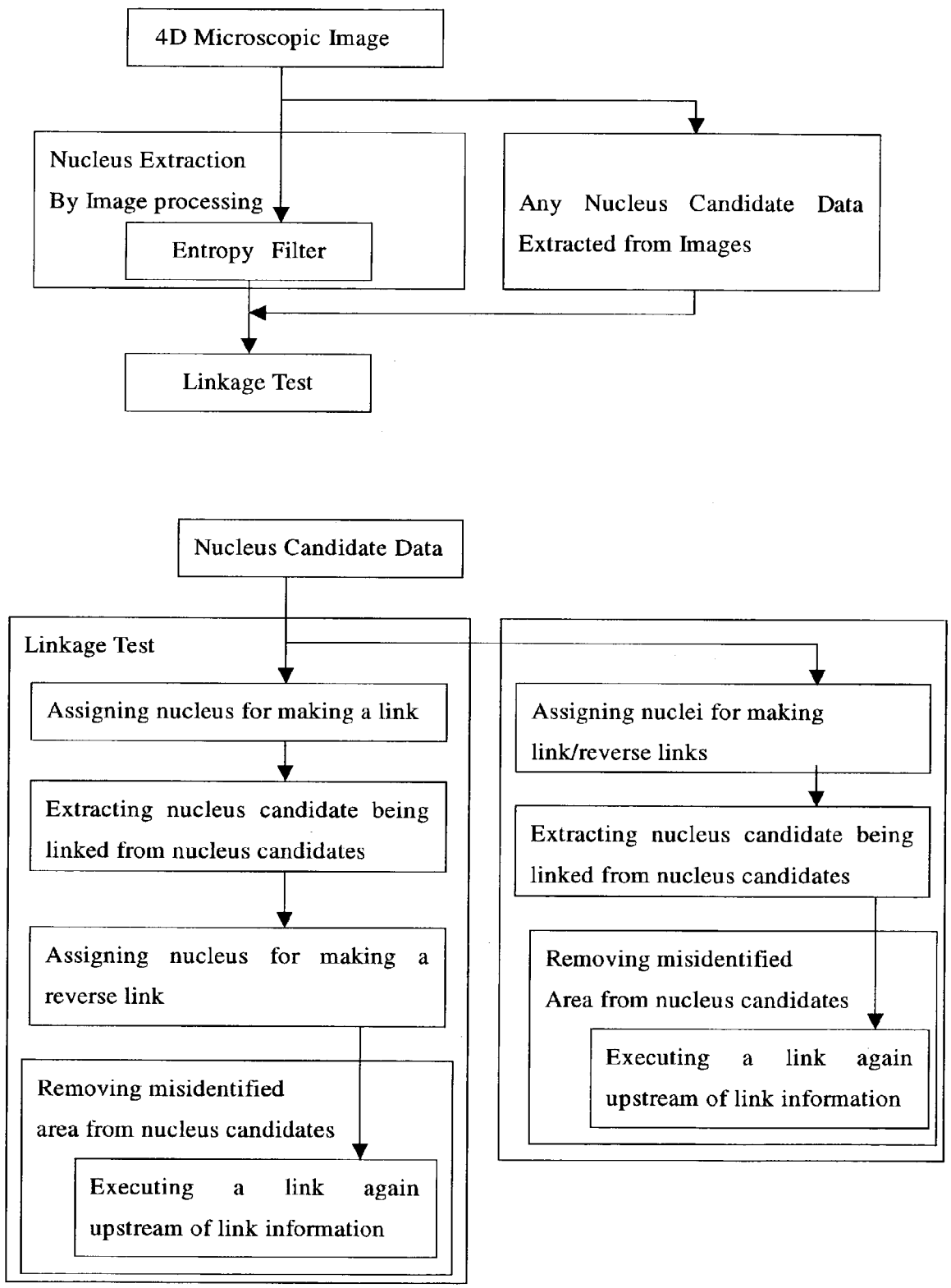
FIG. 1 is a flow chart of a method for extracting the cell lineage related to the present invention.

An embodiment of a method for detecting nucleus area and constructing cell lineage according to the present invention will be described below. As shown in FIG. 1, the method comprises three steps: [I] a step for taking a Nomarski microscope 4D image of a *C. elegans* early embryo, [II] a step for extracting a nucleus candidate in individual 2D images; and [III] a linkage test (nucleus recognition and cell lineage construction).

[4D Microscopic Image]

Figure 7:
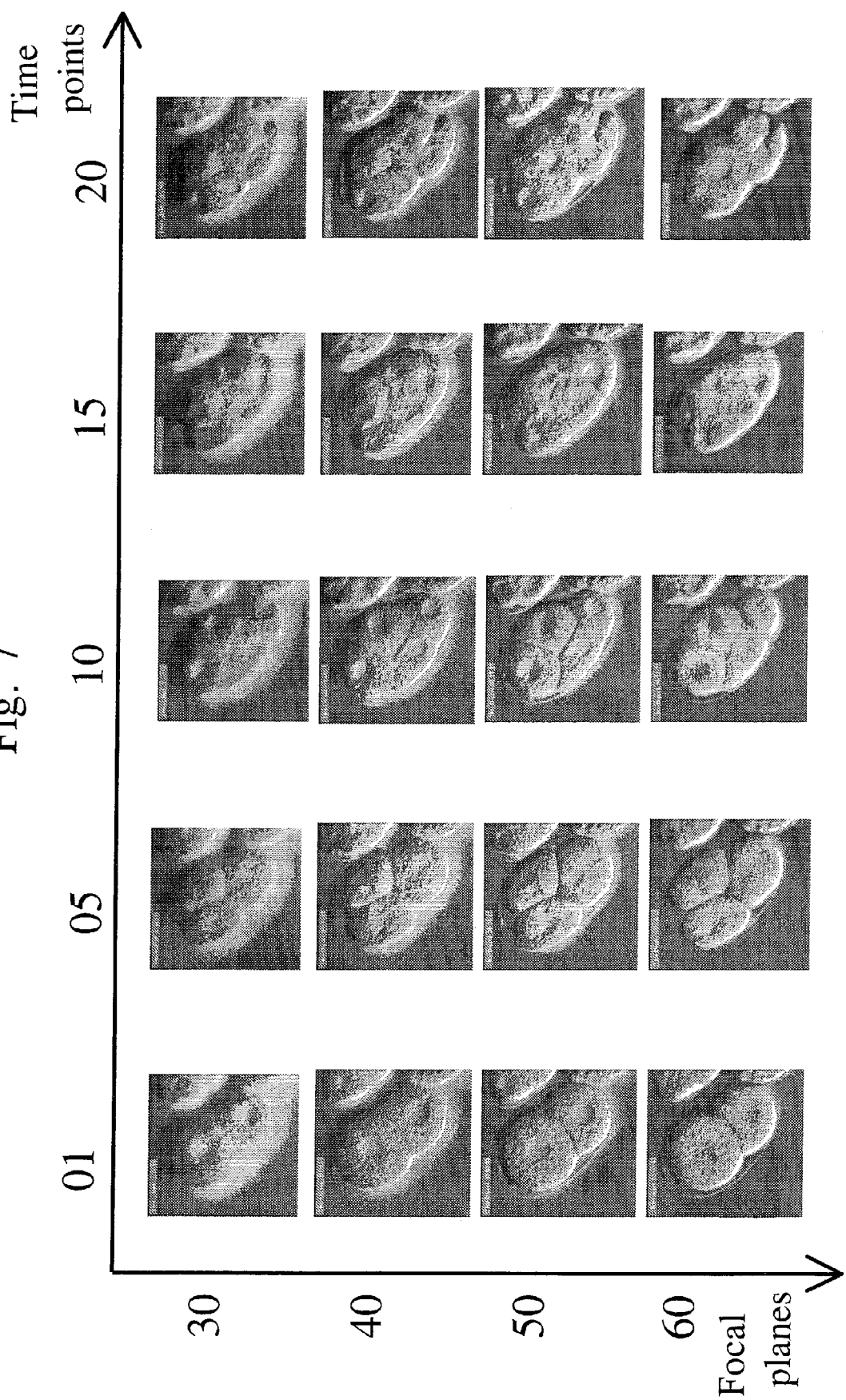
FIG. 7 is a view showing an example of a microscopic image of a subject of processing.

Taking a 4D image of a *C. elegans* early embryo using a Nomarski microscope will be described below. The 4D image is, as described in the foregoing Prior Art section, a plurality of the 2D images taken by changing the focal plane and a plurality of the 2D images taken in a time series. The image prepared by unifying a plurality of the 2D images having different focal planes and different times is called a 4D image. The *C. elegans* early embryo image, being a subject of processing in the present embodiment, is prepared as a set composed of 30 to 90 images obtained by changing the focal plane vertically in 1 to 5 minute intervals. In an experiment, 1780 2D images in total were taken on 89 focal planes and at 20 points in the time series. The radial diameter was about 60 µm along a longer axis of a cell and about 30 µm along a shorter axis. An image was taken every 90 seconds. FIG. 7 shows an example of a microscopic image of the subject of processing. Here, the horizontal axis is the time axis (time) and the vertical axis is the focal axis (focal plane). Preferably, the image is taken using a Nomarski DIC microscope. However, the image used is not restricted to that taken by this microscope.

[Extracting A Nucleus Candidate]

Extracting a position of a nucleus in individual 2D microscopic images will be described below with reference to nucleus area extraction using an entropy filter. The entropy filter is a filter in which entropy of a small section including a noted pixel (x, y) is calculated, and the noted pixel (x, y) is renewed by an obtained entropy value, and is for efficient extraction of the smooth portion or coarse portion from the image. This employs the property that the cytoplasmic portion is coarse in image quality, while, in contrast, the nucleus portion is relatively smooth in image quality.

Figure 2:
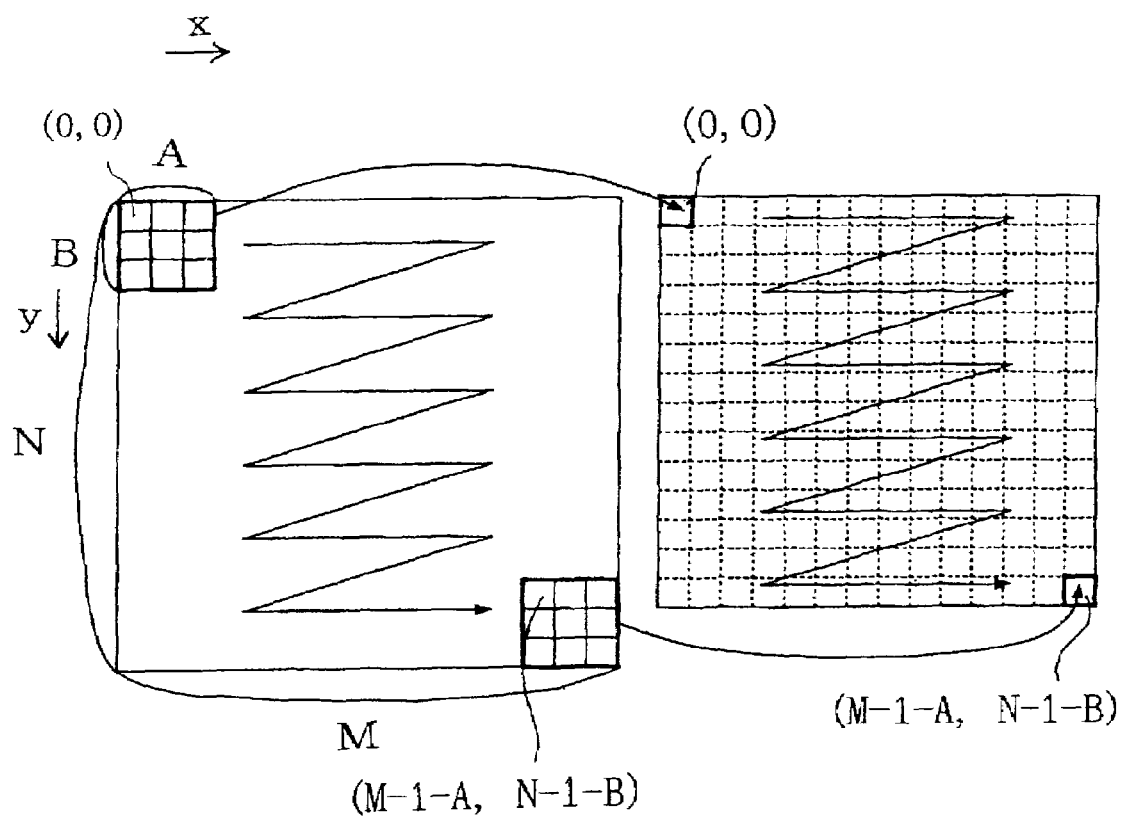
FIG. 2 is a view explaining an entropy filter (a left view is an original image and a right view is a resultant view)

As shown in FIG. 2, a start point (x, y) is determined in the original image with a size of M×N pixels where x is ranged from 0 to (image width minus window width) and y is ranged from 0 to (image height minus window height).

Next, the image is partitioned by a window of size (width, height)=(A, B) from the noted pixel selected as the start point. Entropy of the partitioned window is calculated and the obtained entropy value is saved on the coordinates (x, y) of a resulting image as a new pixel value. In the depicted drawing, x is in a range from 0 to (M minus one minus A), and y is in a range from 0 to (N minus one minus B).

Entropy is calculated based on the following equation (1).

$$(\text{entropy value}) = -\sum_{l=l_{\min}}^{l_{\max}} P(l) \log P(l) \quad (1)$$

In equation (1), P(l) is a gray level histogram produced using a gray level histogram H (l) for the image area as a measure of its characteristics (if a gray level is L, l=0, 1, 2, . . . , L−1), and dividing the frequency of each gray level by the total frequency (a pixel number of the image area), and then normalizing to make the total pixel number 1.0. The nucleus area is discriminated from the cytoplasmic area by referring to the entropy value calculated using equation (1).

The operation involving the calculation of entropy of a small section scanning the original image makes efficient extraction of the position of the nucleus possible. The entropy window size depends on the kind of microscope and magnification used. A good result was obtained by scanning an image area window of 6[pixels]×6 [pixels] to 20 [pixels]× 20 [pixels], (preferably [pixels]×10 [pixels] or 12 [pixels]× 12 [pixels]). In this case, the pixel of the nucleus area ranges according to factors such as cell division from about 1000 pixels to 10000 pixels. The foregoing widow size and number of pixels for the nucleus area are merely given as examples.

Figure 8:
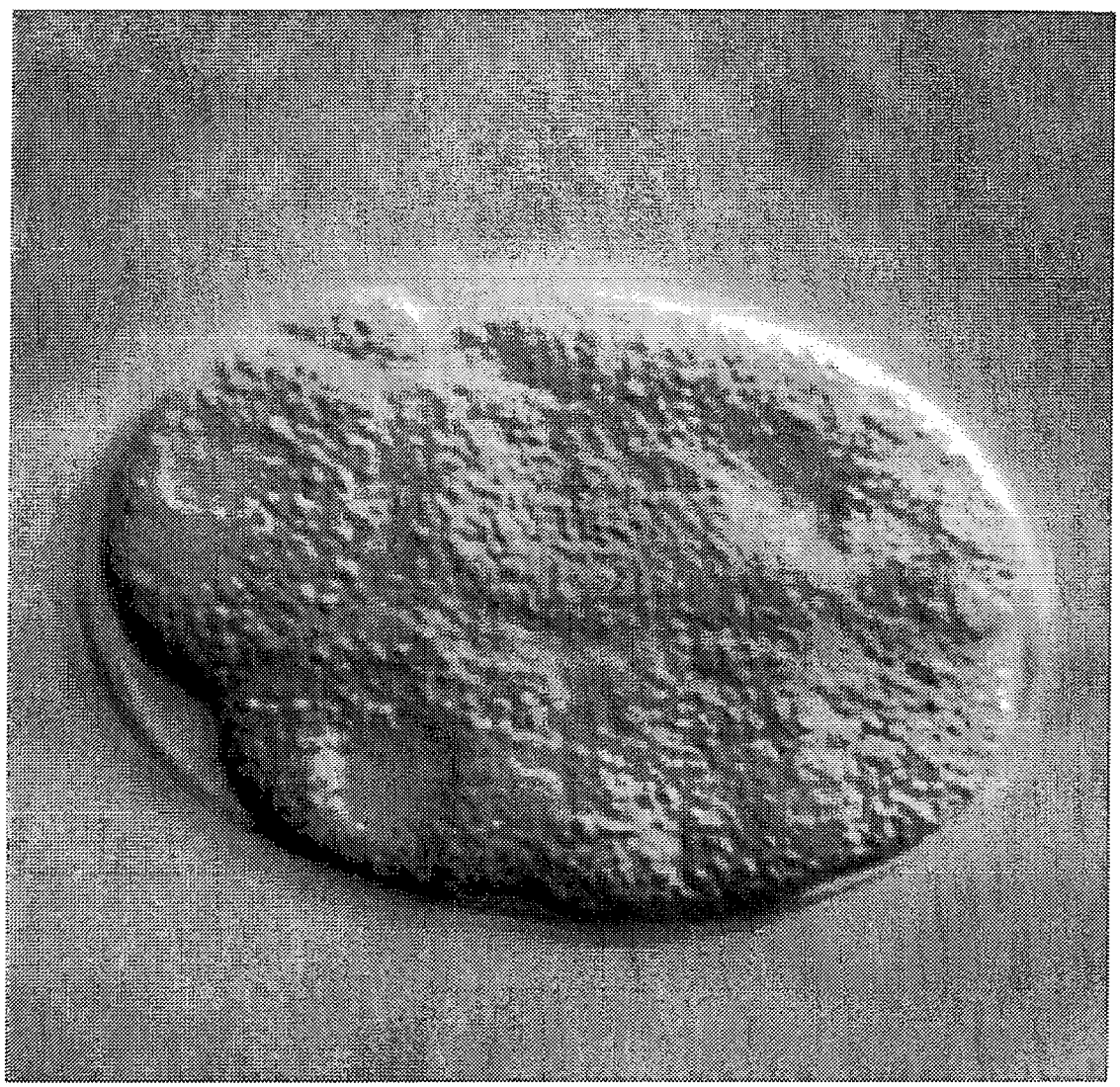
FIG. 8 is a microscopic image of a cell.
Figure 9:
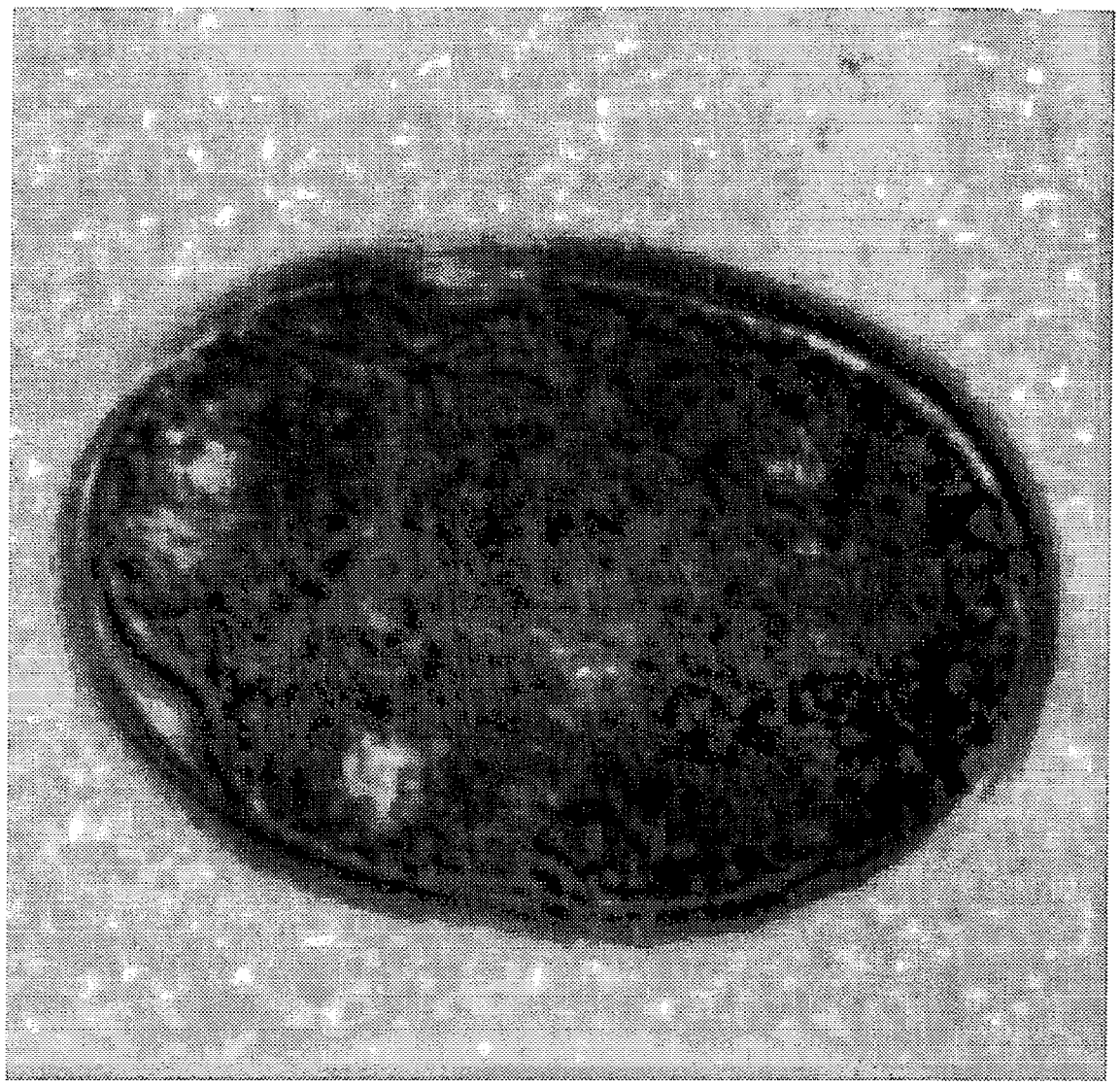
FIG. 9 is a processed image processed by the entropy filter.
Figure 10:
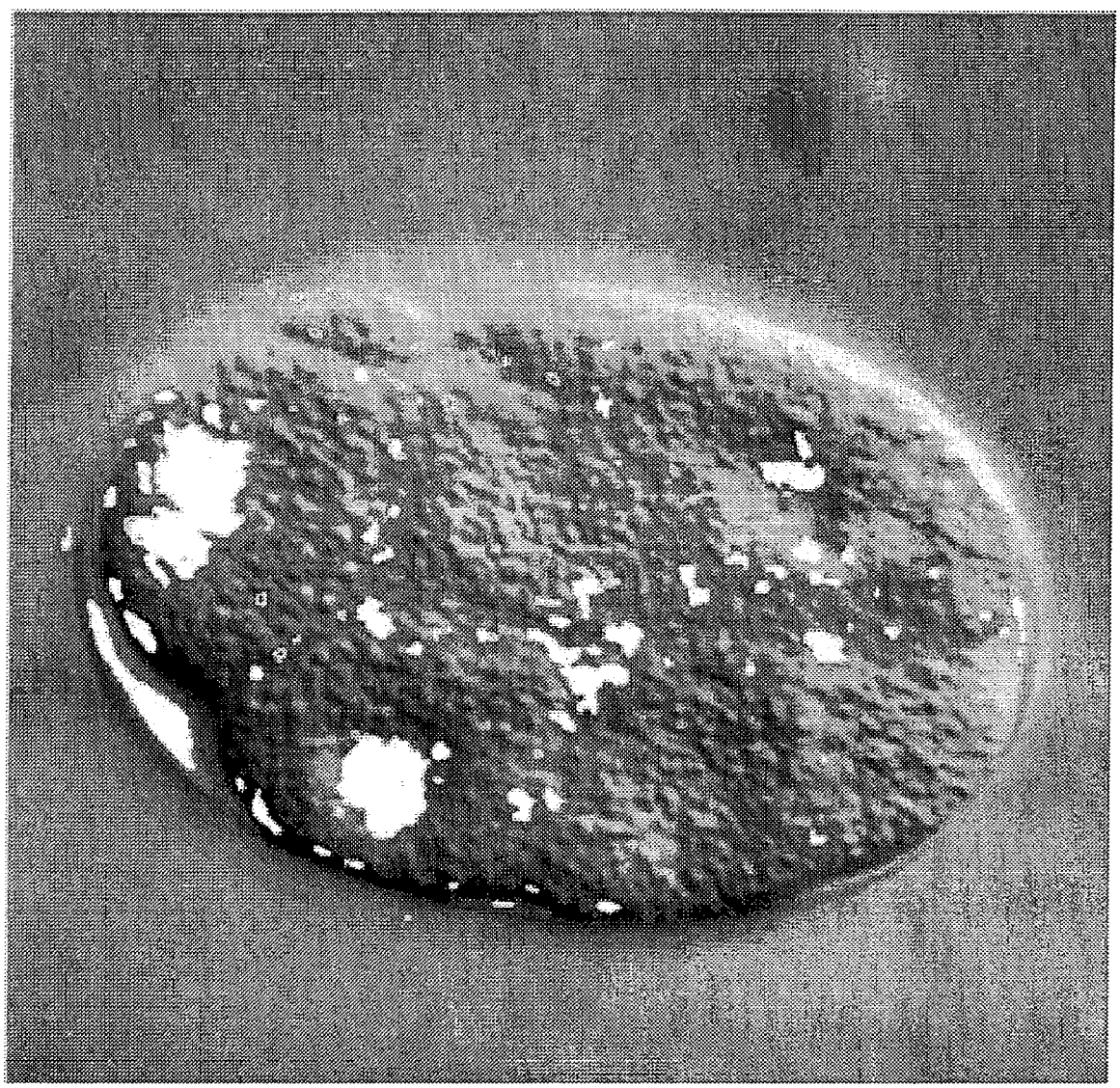
FIG. 10 is a product of superimposing the resultant image (FIG. 10) followed by threshold processing, on the microscopic image of FIG. 8.

Processing of images using the entropy filter will be described below in conjunction with FIG. 8 to FIG. 10. FIG. 8 is a microscopic image of a cell and FIG. 9 is the image (filtering image) of the cell after processing using the entropy filter. FIG. 10 is the product of superimposing the resultant image (FIG. 9), which has been processed by the entropy filter followed by binarization processing with a threshold, on the microscopic image. In this way, a nucleus area is extracted from a 4D image.

Means for extracting a nucleus area is not limited to the entropy filter and may also be implemented using other methods. The step of extracting the nucleus may comprise an approach for detecting an area, where the fine brightness variation in the image is poor, as the nucleus, or an approach for extracting a part, in which the change in the intensity is large in a wide range along the incident angle of the light, as the nucleus. The former is exemplified by that using a Kirsch filter, Prewitt filter, or FFT filter. The Kirsch filter is a filter prepared preferably by a combination of a Kirsch template type edge detection operator with a moving average. The Prewitt filter is a filter preferably binarizing the output of a Prewitt template type edge detection operator and applying a distance transform. For the latter, a filter for taking a difference in a sum of intensity value of a predetermined top and bottom pixel along a seeming angle of light is adopted.

[Linkage Test]

Nucleus candidates contained in 4D images were extracted. The extracted nucleus candidates include real nuclei as well as misidentified nucleus candidates that are not real nuclei. A linkage test makes it possible to efficiently remove the misidentified nucleus candidates and efficiently construct the cell lineage.

Figure 3:
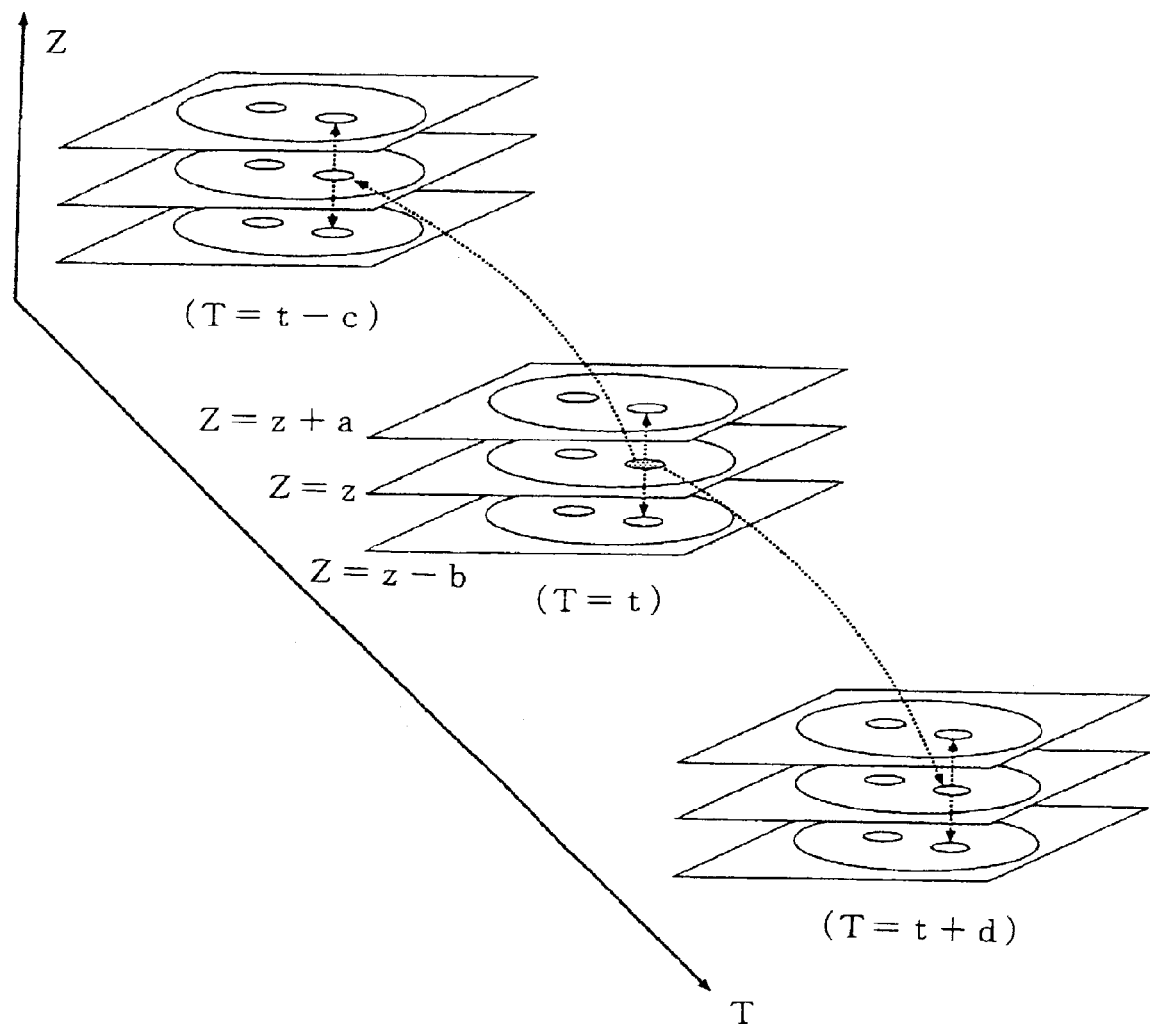
FIG. 3 is a view showing link in z axial direction and a time axial direction.

In this specification, "being linked" means that, between nucleus areas or nucleus candidates, if a specified condition is met, they are regarded as being linked. As shown in FIG. 3, the link comprises a link in a z axial direction and a link in a time axial direction.

[link in a z axial direction]
Link between Z=z and Z=z+a is effective. (a is an arbitrarily number)
Link between Z=z and Z=z−b is effective. (b is an arbitrarily number)

[Link in a time axial direction]
Link between T=t and T=t−c is effective. (c is an arbitrary number)
Link between T=t and T=t+d is effective. (d is an arbitrary number)

In one most preferable example, a, b, c and d are one (i.e. neighboring images in a z axial direction or in a time axial direction). It is not necessary that a, b, c and d are one but an image may be linked to another image in a z axial direction or a time axial direction through neighboring images.

Figure 4A:
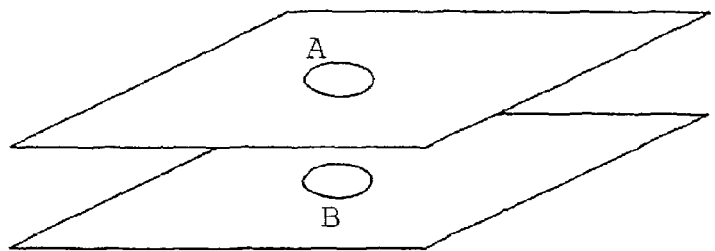
FIG. 4 is a view showing link conditions.
Figure 4B:
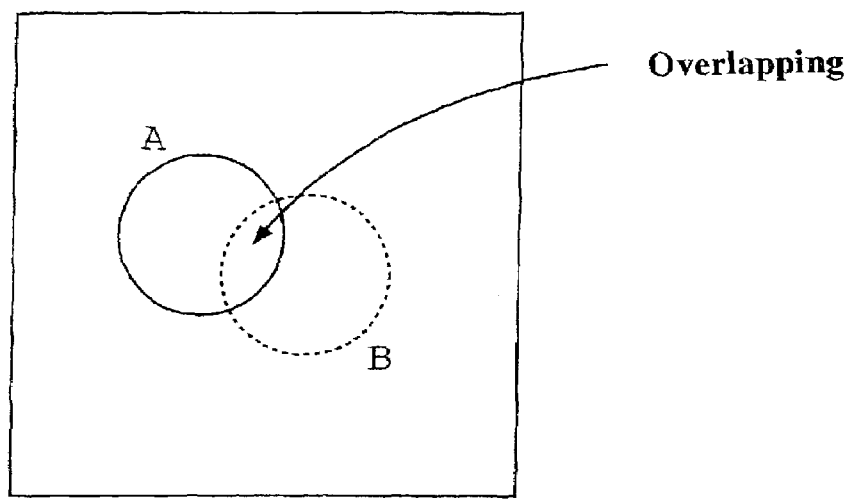
Figure 4C:
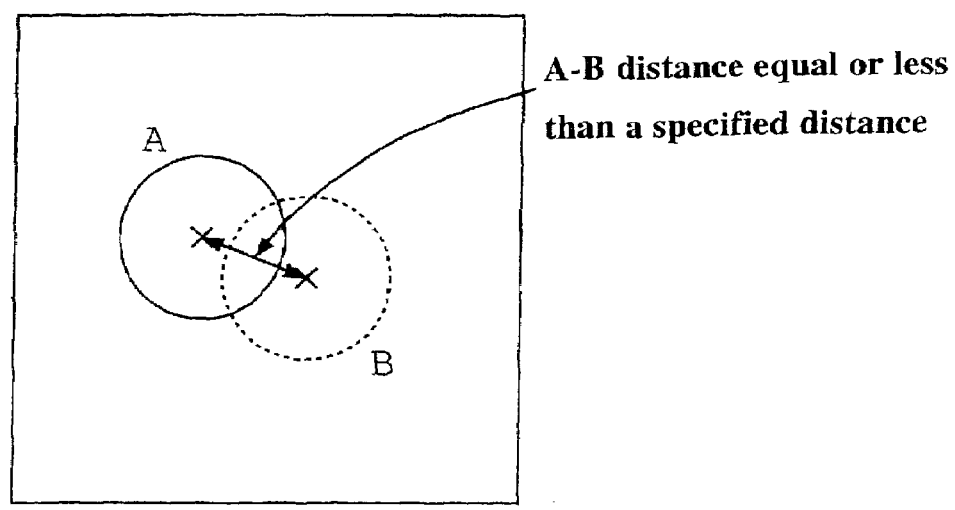

Link conditions are described below with reference to FIG. 4. As shown in FIG. 4(A), in the case where nucleus areas A, B, which are targets to be linked, are present, the link conditions are subject to the following two conditions. One is that, as shown in FIG. 4 (B), two nucleus areas A, B are overlapped in an x-y plane (condition 1). Another is that, as shown in FIG. 4(C), nucleus areas A, B, constituting a link-origin and a link-target, are positioned at a distance shorter than a specified distance (condition 2). Between two nucleus areas A, B, when one of the conditions 1, 2 is met, the two nucleus areas A, B are regarded as being linked. Generally, the link is determined solely by the condition 1.

Figure 5A:
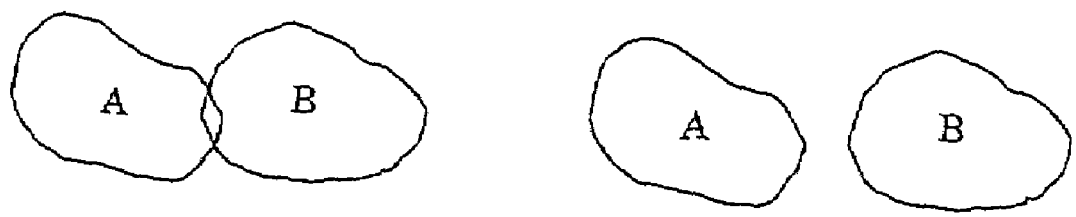
FIG. 5 is a view showing link determination in which a left view shows "being linked" and a right view shows "not being linked"

Link determination by condition 1 will be described with reference to FIG. 5. According to a method as shown in FIG. 5 (A), if there exists an overlapping portion between nucleus area candidates A, B, even if this is only one pixel, the nucleus area candidates A and B are regarded as "being linked", and if there exists no overlapping portion, the nucleus area candidates are regarded as "not being linked". According to another method, a predetermined threshold is set to an area of an overlapping portion and if the overlapping portion is larger than the threshold, the candidates are regarded as "being linked".

Figure 5B:
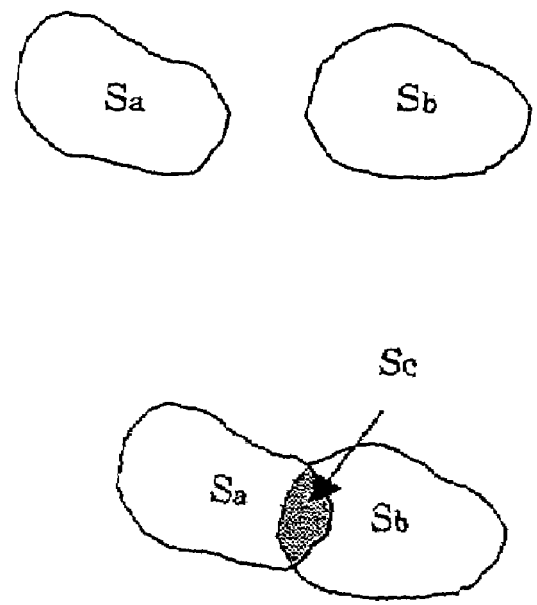

An improved method will be described with reference to FIG. 5(B). An area of a nucleus section A is Sa and an area of a nucleus section B is Sb where the sections A, B are the link targets. When the nucleus sections A and B overlap, an area of an overlapping portion is Sc. Link determination is to be performed as follows. If both Value A and Value B are greater than a threshold α, two sections are regarded as being linked where Value A is a value obtained by dividing the area Sc of a common sharing portion by Sa and Value B is a value obtained by dividing the area Sc of common sharing portion by Sb. If at least either of Value A or Value B is smaller than a threshold α, the sections are regarded as not being linked. In a preferable example, in the case of the link in a time axial direction, a threshold α is set within a range of 10% to 20%. In a preferable example, in the case of the link in a z axial direction, a threshold α is set within a range of 30% to 50%.

As mentioned above, normally, the linkage test is done solely by using condition 1. The reason for employing condition 2 is that, if a nucleus candidate becomes small, the overlapping of condition 1 becomes too stringent and linking becomes impossible, and it may be necessary to deal with two nucleus candidates positioned within a certain distance as being linked. The distance in the condition 2 is a distance within a three-dimensional space of x-y-z space. Therefore, the distance between A and B in FIG. 4(C) is a 3D distance. When calculating the distance, a centroid coordinate (x, y) that is set for each nucleus candidate is used. In the 4D microscopic images, it is strictly determined which image corresponds to which picture of which height in micrometers when taking images.

Steps for linkage test will be described. At first, one or more noted cells are selected from the images when the cell lineage or cell division lineage of a specific noted cell is to be detected. One or more nucleus areas in the selected cell(s) are selected as first information (a first starting nucleus). A nucleus candidate that is to be linked is sequentially extracted from an image set, starting with the first starting nucleus in accordance with the predetermined condition (the condition in FIG. 5(*b*), for example).

Figure 6:
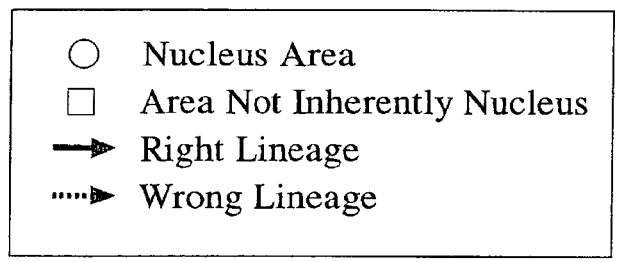
FIG. 6 is a view showing a forward link and reverse link.
Figure 6:
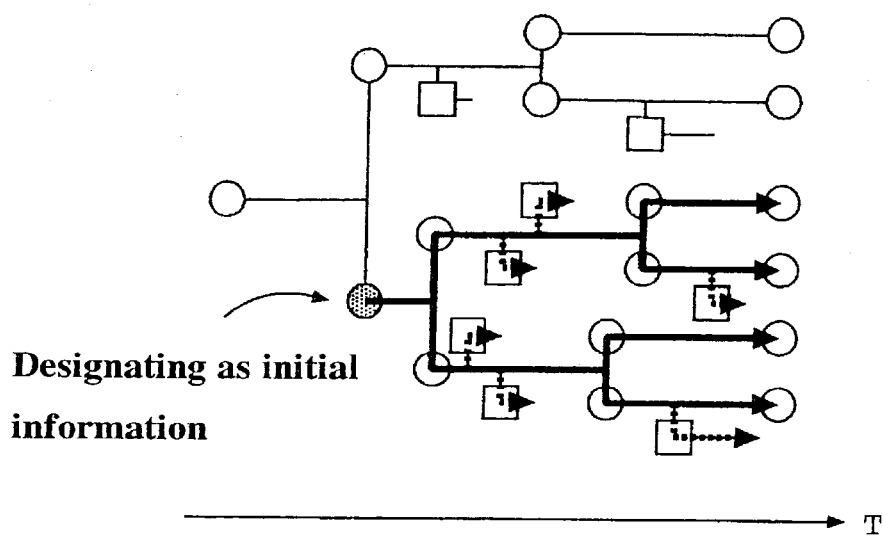
Figure 6:
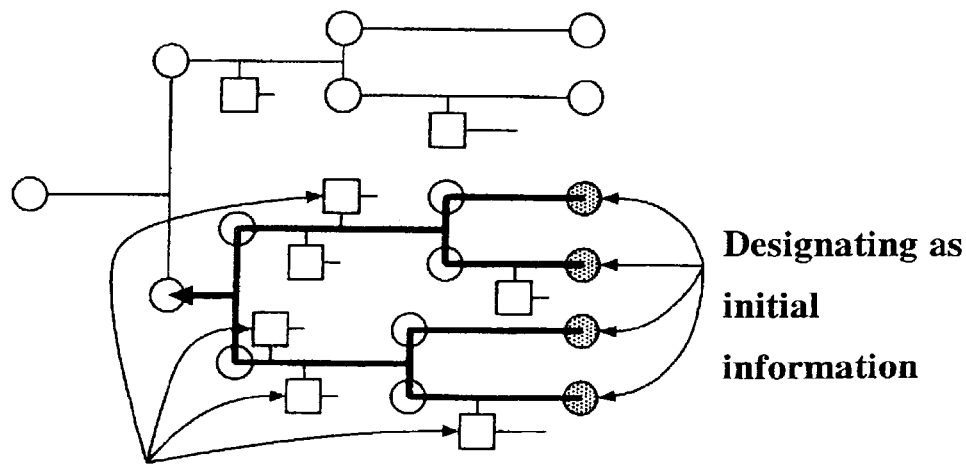

A series of forward link information is obtained by sequentially executing a link (forward link) downstream (from an older to a newer item in a time series) from the assigned nucleus as the starting nucleus, thereby constructing a preparatory cell lineage as shown in an upper figure of FIG. 6. The cell lineage is constructed together with the link information by recognizing a position where a branch of forward link information is increased as a cell division. In the preparatory cell lineage as shown in an upper figure of FIG. 6, there is a possibility that an area that is not a real nucleus is included.

Next, a nucleus area of a specific portion is assigned from the obtained link information as second initial information (a second starting nucleus) and a link (reverse link) is again executed upstream (from a newer to an older item in a time series) as shown in a lower figure of FIG. 6. Information in the forward link information that is not included in the link information of the reverse link is determined as a misidentified area and removed. Namely, the link information of a misidentified area is automatically removed by executing the reverse link.

Figure 11:
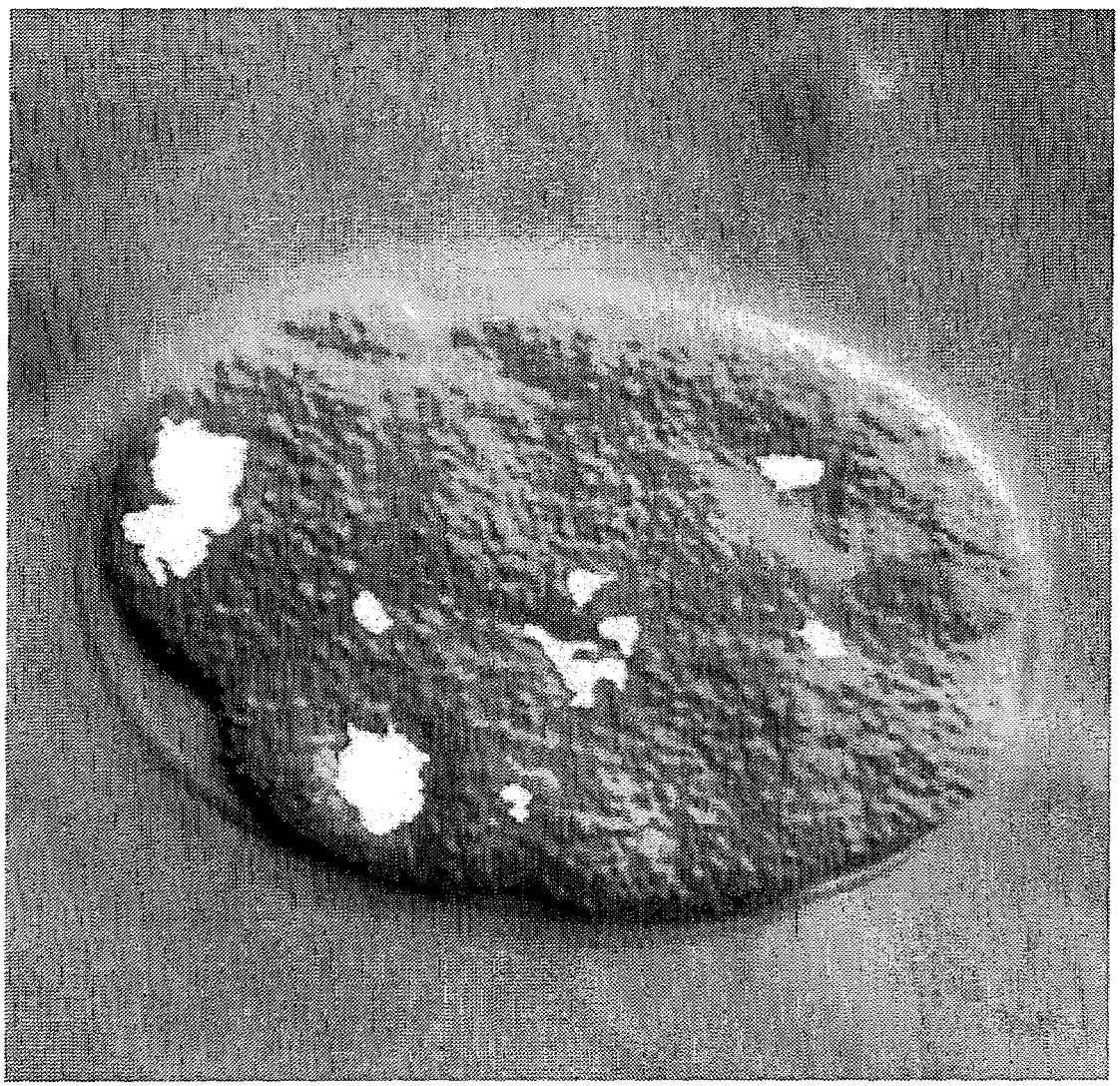
FIG. 11 is a view showing the resultant image after the forward link of the image in which an nucleus area is extracted.
Figure 12:
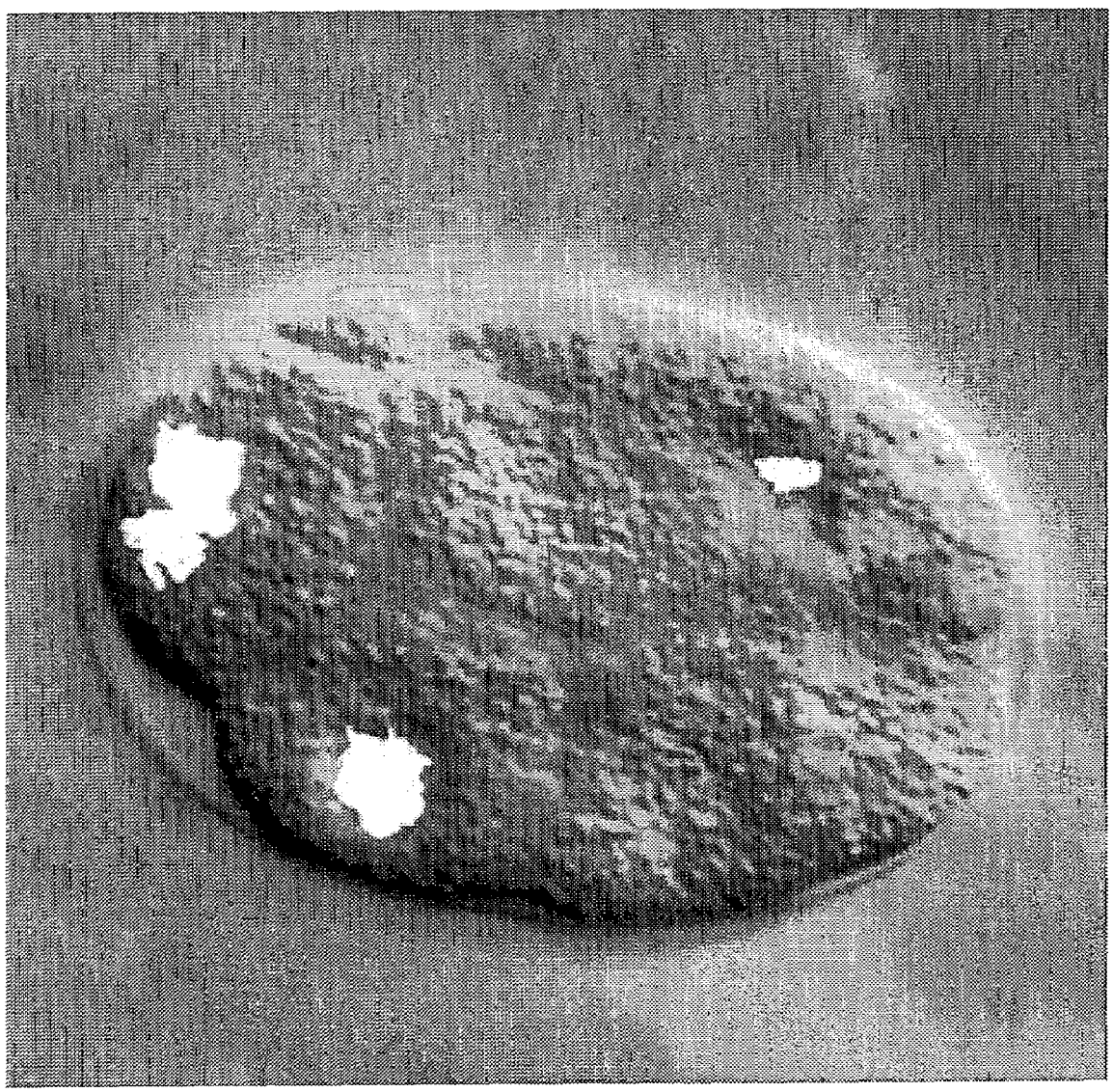
FIG. 12 is a view in which misidentified areas have been removed by the linkage test (the reverse link) from an image in FIG. 11.

FIG. 11 shows nucleus candidates recognized as the result of a forward link with regard to an image of FIG. 10. FIG. 12 is an image in which the misidentified areas are removed by the result of linkage test (reverse link) from the nucleus candidates in FIG. 11. Nine nucleus candidates are recognized in FIG. 11 while three nucleus candidates are regarded as the nucleus as the result of reverse link. In the figure (FIG. 10) in which the nucleus areas are extracted from the original microscopic image (FIG. 8) by the entropy filter, many unnecessary fragments are present in addition to the nucleus areas. However, as shown in FIG. 11, most fragments are removed during the forward link process. Further, the fragments are completely removed by the reverse link. In addition, in the link process, a threshold (area threshold of 500 pixels for one example) is set to remove areas that are too small so that the fragments may be removed depending on the area of the extracted section other than the forward link and reverse link.

The linkage test makes it possible not only to remove misidentified nucleus candidate areas but also to automatically construct the cell lineage simultaneously with the removal of misidentified areas. As in the foregoing description, the cell lineage is constructed together with the link information by recognizing a position where a branch of forward link information is increased as a cell division. The preparatory cell lineage is constructed by the forward link and then the misidentified link is automatically removed from the preparatory cell lineage by the reverse link, thereby constructing a precise cell lineage.

The nucleus to be assigned as initial information in the reverse link is not necessarily the link information obtained by the forward link. For example, at first, a starting nucleus for the forward link and a starting nucleus for the reverse link are assigned respectively in a plurality of 4D images, and then, the forward link and the reverse link may each be executed. Also, the link may be executed both downstream and upstream from an arbitrarily selected nucleus.

The present invention has the following advantages.
(1) The cell lineage can automatically be constructed from the extracted nucleus candidates, and cell lineage construction that was both complex and required a considerable amount of labor in the prior art can be constructed in a less labor intensive manner and in less time.
(2) Misidentified areas (false positives) can be efficiently removed from the extracted nucleus areas.
(3) It is possible to select a noted cell and cell lineage with respect to the cell can be constructed.
(4) Nucleus position and cell lineage can be expressed as a concrete number (coordinate, time).
(5) Displacement of a nucleus, velocity of cell move, and displacement of nucleus area by cell division of a noted cell can be expressed as a concrete number (coordinate, time).

INDUSTRIAL APPLICABILITY

In fields of pharmacy, medical care, agriculture, and food, the present invention can be applied to product development using effective genomic information.

What is claimed is:

1. A method for detecting a nucleus area comprising the steps of:
   (a) selecting one or more nuclei from a plurality of nucleus area candidates as initial information, said nucleus area candidates being extracted from a plurality of 4D microscopic images of a cell;
   (b) obtaining linkage information by sequentially extracting a nucleus area candidate that meets a predetermined link condition with regard to said initial information from said 4D images; and
   (c) removing non-nucleus area candidates from said obtained linkage information, said removing comprising the steps of:
   (d) selecting one or more nuclei from a plurality of nucleus area candidates other than said first initial information as second initial information, said nucleus area candidates being extracted from a plurality of 4D microscopic images;
   (e) obtaining reverse linkage information by sequentially extracting a nucleus area candidate that meets a predetermined link condition with regard to said second initial information from said 4D images, said reverse link executing in a direction opposite to a direction of said link based on said first initial information; and
   (f) removing a nucleus area candidate that is not included in said reverse linkage information from said obtained linkage information on said first initial information.

2. The method as claimed in claim 1, wherein said 4D images comprise a plurality of 2D images having different focal planes and different times, and said 2D images are taken by changing the focal plane and taken in a time series.

3. The method as claimed in claim 1, wherein said obtaining comprises linking a nucleus area candidate that links to said one or more nuclei selected as said initial information in a time series in one direction.

4. The method as claimed in claim 3, wherein said obtaining comprises linking a nucleus area candidate in a time series from an older area nucleus candidate to a newer nucleus area candidate.

5. The method as claimed in claim 1, wherein said second initial information is selected from said linkage information.

6. The method as claimed in claim 1, wherein said linkage information on said first initial information is obtained by linking from an older nucleus area candidate to a newer nucleus area candidate in a time series, and wherein said reverse linkage information is obtained by linking a newer nucleus area candidate to an older nucleus area candidate in a time series.

7. The method as claimed in claim 1, wherein said linkage is made in a z axial direction and/or a time axial direction.

8. The method as claimed in claim 1, wherein two nucleus areas are determined as being linked where said two nucleus areas are overlapped in an x-y plane.

9. The method as claimed in claim 8, wherein two nucleus areas are determined as being linked where said overlapping area occupies a predetermined ratio as to an area of each nucleus section.

10. The method as claimed in claim 9, wherein two nucleus areas are determined as being linked where both of each value, that is obtained by dividing the overlapping area by an area of each nucleus section respectively, exceed a predetermined threshold.

11. The method as claimed in claim 1, wherein two nucleus areas are determined as being linked where a distance between said two nucleus areas is a shorter than a predetermined distance.

12. A method for detecting a nucleus area comprising the steps of:
   (a) selecting one or more nuclei for making a forward link from extracted nucleus candidates, in a plurality of 4D microscopic images in which the nucleus candidates are extracted;
   (b) obtaining forward linkage information by sequentially extracting a nucleus candidate meeting a predetermined link condition with regard to said selected one or more nuclei as initial information from said 4D images;
   (c) selecting one or more nuclei for making a backward link from said linkage information, said one or more nuclei for backward link being other than said one or more nuclei selected in the step (a); and
   (d) obtaining backward linkage information by sequentially extracting a nucleus candidate meeting a predetermined link condition with regard to said selected nucleus for backward linkage as second initial information from said 4D images, and removing misidentified nucleus candidates from said forward link information with reference to said backward link information.

13. A method for detecting a nucleus area comprising the steps of:
   (a) selecting one or more nuclei for making a forward link and a backward link respectively from extracted nucleus candidates, in a plurality of 4D microscopic images in which the nucleus candidates are extracted;
   (b) obtaining forward linkage information by sequentially extracting a nucleus candidate that meets a predetermined link condition with regard to said selected one or more nuclei for forward linkage from said 4D images; and
   (c) obtaining backward linkage information by sequentially extracting a nucleus candidate that meets a predetermined link condition with regard to said selected one or more nuclei for backward linkage from said 4D images, and removing misidentified nucleus candidates from said forward link information based on said backward link information.

14. A method for constructing cell lineage utilizing said method for detecting nucleus areas as claimed in claim 1, wherein, in said link information, a position where a branch of link information is increased is regarded as a cell division.

15. A method for constructing cell lineage comprising the steps of:
   (a) selecting one or more nuclei for making a forward link from extracted nucleus candidates, in a plurality of 4D microscopic images in which the nucleus candidates are extracted;
   (b) obtaining forward linkage information by sequentially extracting a nucleus candidate that meets a predetermined link condition with regard to said selected one or more nuclei from said 4D images;
   (c) selecting one or more nuclei for making a reverse link from said forward linkage information; and
   (d) obtaining backward linkage information by sequentially extracting a nucleus candidate that meets a predetermined link condition with regard to said selected one or more nuclei for backward link from said 4D images, removing misidentified nucleus candidates from said forward link information based on said backward link information and wherein a position where a branch of link information is increased is regarded as a cell division.

16. A method for constructing cell lineage comprising the steps of:
   (a) selecting one or more nuclei for making a forward link and a backward link respectively from extracted nucleus candidates, in a plurality of 4D microscopic images in which the nucleus candidates are extracted;
   (b) obtaining forward linkage information by sequentially extracting a nucleus candidate that meets a predetermined link condition with regard to said selected one or more nuclei for forward link from said 4D images; and
   (c) obtaining backward linkage information by sequentially extracting a nucleus candidate that meets a predetermined link condition with regard to said selected one or more nuclei for backward linkage from said 4D images, removing misidentified nucleus candidates from said forward link information based on said backward link information and wherein a position where a branch of link information is increased is regarded as a cell division.

* * * * *

UNITED STATES PATENT AND TRADEMARK OFFICE
CERTIFICATE OF CORRECTION

PATENT NO. : 7,327,867 B2  Page 1 of 1
APPLICATION NO. : 10/203058
DATED : February 5, 2008
INVENTOR(S) : S. Hamahashi et al.

It is certified that error appears in the above-identified patent and that said Letters Patent is hereby corrected as shown below:

On The Title Page,
Item (56) P.2, Refs. Cited (Other Publs., item 3) delete as duplicative the reference beginning "Assessing Normal" and ending "DB978509."

Col. 8 lines 15-28 (Claim 1,) double indent the clauses beginning "(d)" and ending "first initial information."

Col. 8 line 66 (Claim 11,) "is a shorter than" should read --is shorter than--

Col. 9 line 13 (Claim 12,) "for backward link" should read --for the backward link--

Col. 10 line 33 (Claim 16,) "for forward link" should read --for the forward link--

Signed and Sealed this

Eighth Day of July, 2008

JON W. DUDAS
*Director of the United States Patent and Trademark Office*